No. 883,758. PATENTED APR. 7, 1908.
J. J. STOPPLE.
BALING PRESS.
APPLICATION FILED SEPT. 14, 1907.
2 SHEETS—SHEET 1.
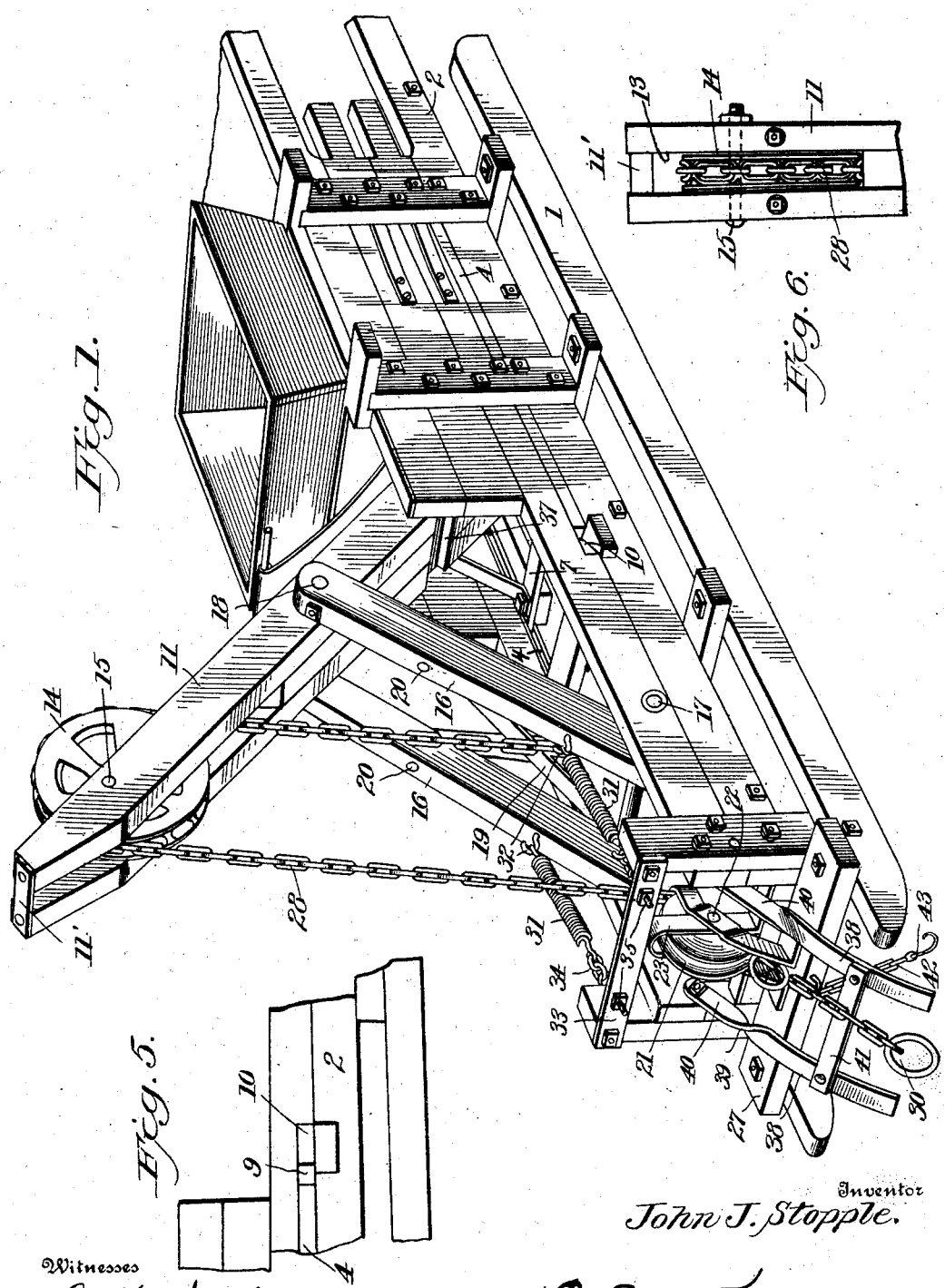
Witnesses
C. H. Walker
J. T. Walker
Inventor
John J. Stopple.
By E. E. Vrooman,
his Attorney

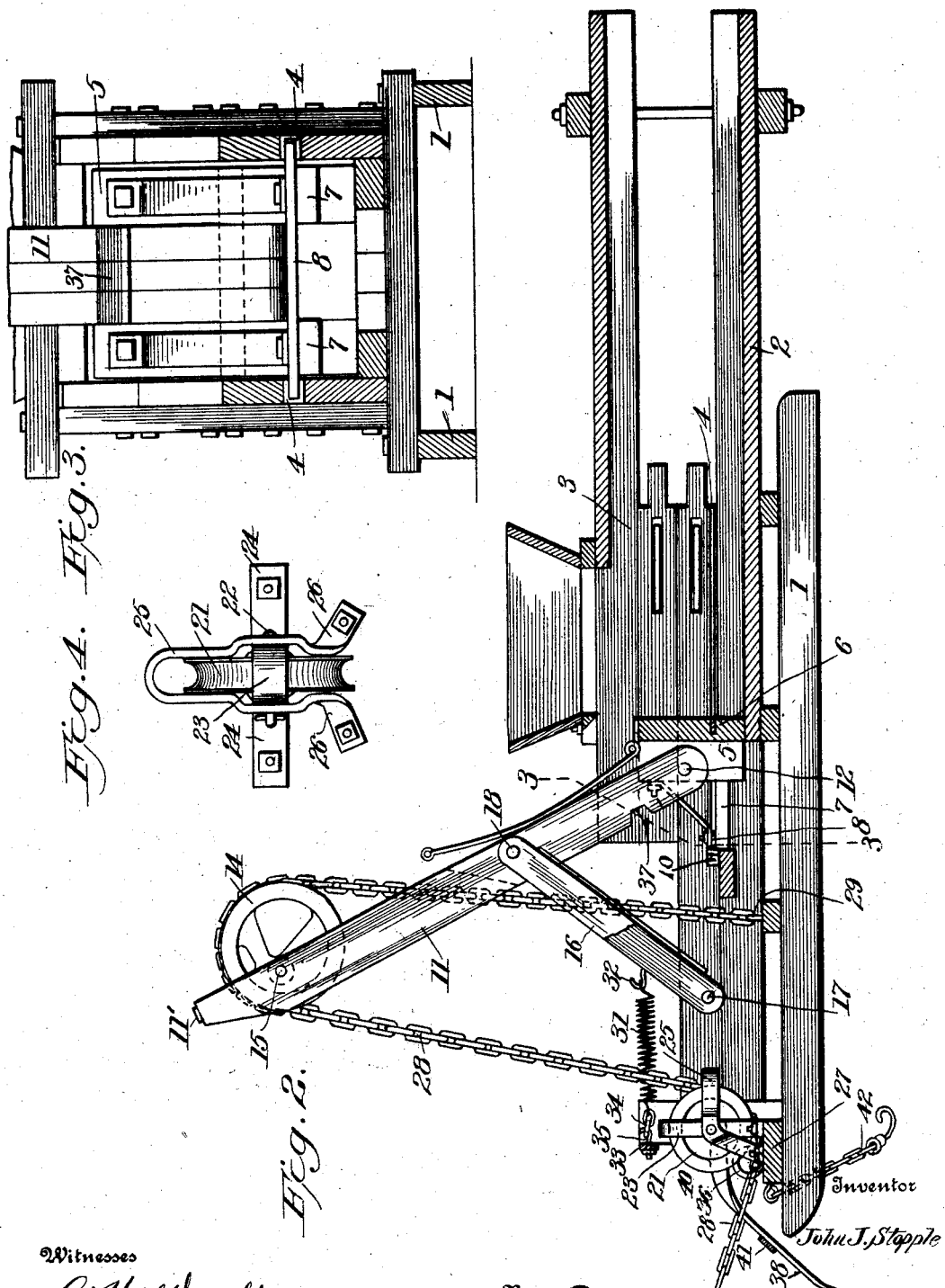

UNITED STATES PATENT OFFICE.

JOHN J. STOPPLE, OF DALLAS, TEXAS.

BALING-PRESS.

No. 883,758.  Specification of Letters Patent.  Patented April 7, 1908.

Application filed September 14, 1907. Serial No. 392,855.

*To all whom it may concern:*

Be it known that I, JOHN J. STOPPLE, a citizen of the United States, residing at Dallas, in the county of Dallas and State of Texas, have invented certain new and useful Improvements in Baling-Presses, of which the following is a specification, reference being had therein to the accompanying drawing.

This invention relates to improvements in baling presses, and has for its object the provision of means for facilitating the compression of charges and the forming of a bale of hay, straw, or like material Another object of this invention is the improvement of the construction of the baling press disclosed in my prior patent No. 844,053, issued Feb. 12, 1907.

With these and other objects in view, the invention consists of certain novel constructions, combinations, and arrangements of parts, as will be hereinafter fully described and claimed.

In the drawings: Figure 1 is a perspective view of a baling press constructed in accordance with my invention. Fig. 2 is a longitudinal sectional view of the press depicted in Fig. 1. Fig. 3 is a transverse sectional view taken on line 3, 3, Fig. 2. Fig. 4 is a top plan view of a sheave or pulley-supporting device. Fig. 5 is a fragmentary side view of the press. Fig. 6 is a fragmentary view of the upper end of the lever.

Referring to the drawings by numerals, the runners 1 carry the framework 2 in which is formed the baling or compression chamber 3. The framework 1 is provided with solid sides, in which are formed or countersunk guides 4, which are, preferably, substantially U-shaped in cross-section; the reinforcing guides 4 being formed preferably from channel-iron. Slidably mounted within the compression chamber is a plunger-head 5. The plunger-head 5 is provided with a bar 6 countersunk therein, the ends of which bar extend beyond the ends of the plunger-head 5 and into the guides 4. The rearwardly extending beams or members 7 of the plunger-head 5 are also provided with a transverse bar 8, the ends of which bar 8 project into the guides 4, Fig. 3.

In the sides of the framework 2 and contiguous to the rear ends of the guides 4, there are formed openings 9, Figs. 1 and 5, which permit any foreign substance in the guides 4 to be forced out of the rear ends and discharged upon the outside of the press, as the sides are beveled, at 10, which beveled portions 10 constitute guides for directing the material or foreign substance through the discharge outward. It will be noted that the inner ends of the beveled portions 10 terminate contiguous to the front edges of the guides 4, whereas the rear ends of the beveled portions 10 terminate in the same vertical plane in which the sides of the press are formed. At each rearward stroke of the plunger-head, the bar 8 will be moved to the rear of the guides 4, and, consequently, the rear edge of the bar 8 will be positioned contiguous to the inner ends of the beveled portions 10, and it will also be apparent that if there is any foreign material in said guides, such material will be forced into the openings 9 and upon each successive stroke of the plunger, if there is any foreign substance in the guides, the same will be gradually forced outside of the press.

The lever 11 is pivotally secured, near its lower end, at 12, to the plunger 5. The lever 11 is, preferably, formed of a plurality of parallel pieces, and the inner piece is terminated short of the upper end of the lever, thereby producing a bifurcated portion 13, within which is rotatably mounted an eccentric sheave or gear wheel 14. The two outer pieces of the lever are connected at their upper ends, by a reinforcing plate 11'. The eccentric sheave or wheel 14 is pivotally mounted upon, preferably, a bolt or axle 15. I, preferably, employ links or toggle-arms 16, which links are pivotally mounted near their lower ends upon, preferably, a rod or member 17, and near their upper ends, are pivotally connected, at 18, to the lever 11. Said links 16 constitute a fulcrum for the lever. Reinforcing bars 19 are connected, at 20, to the links or toggle-irons 16, for strengthening the link-structure of the press.

A pulley or grooved wheel 21 is journaled upon an axle 22, which axle is carried by a peculiarly-constructed frame. The frame comprises a substantially inverted U-shaped section 23 having at its lower ends laterally-extending portions 24, which portions are fixedly secured to the frame. An auxiliary or guide and guard section 25 is in engagement with the section 23 and comprises a substantially U-shaped, inclined member, which is also provided with laterally-extending portions 26, substantially the same as portions 24. The portions 26 are fixedly secured, preferably, to a transverse beam or member 27 of the frame. The section 25 protects or guards the pulley or sheave wheel 21, as it surrounds nearly the entire wheel. A chain 28 is secured, preferably, near its inner end, as at 29, to a suitable transverse bar or beam of the frame, and said chain is passed over the eccentric sheave or wheel 14 and under the auxiliary sheave or pulley 21. It is to be noted that the section 25 of the auxiliary sheave-supporting frame acts as a guide for retaining the chain in position upon the sheave or wheel 21. I, preferably, attach, at 30, a draft animal or the power for actuating the plunger and lever.

To cause the rebound of the plunger 5 and the return of the lever 11 and the links or toggle-arms 16 to their normal position, Fig. 1, I employ a peculiar device, which comprises comparatively short coil-springs 31 attached, preferably, at their inner ends to hooks 32. It will be noted that hooks 32 are secured to the links or toggle-arms 16 near their lower ends, whereby comparatively short springs may be employed, as the springs are connected, at their outer ends, to a transverse bar 33, by means of, preferably, short chains 34 and hook-bolts 35. The hook-bolts 35 extend through the bar 33 and may be adjusted upon said bar by rotating the ordinary nuts carried by the outer ends. Another adjustment may be obtained by adjusting or placing upon the hook-bolts 35 different links of the chains 34. It will, therefore, be noted that I have provided two means for adjusting the tension of the springs 31, to wit: chains and bolts.

After the eccentric sheave or wheel 14 has been properly positioned, Fig. 1, and the chain 28 is drawn taut, suitable means may be attached to the chain for holding the chain taut, and this means, preferably, comprises a ring 36, which is of sufficient size to prevent the same from passing under the sheave or pulley 21, Figs. 1 and 2. However, the ring 36 does not interfere with the operation of my press, but will prevent the chain 28 from being displaced off of the sheave 14 or the outer end of said chain 28 sliding through the sheave-supporting frame which would necessitate threading the chain 28 under the sheave or pulley 21, involving a loss of time. The lever 11 is provided with a transverse cut-out portion or notch 37, in which is seated the bar 7, as the lever 11 is swung downward to its lowest position upon the frame. After the lever has been moved to its lowest position and the power is removed from the outer end of the chain 28, the comparatively short springs 31 will cause the plunger and lever to rebound or will bring the plunger to its furthest position towards the rear of the baling chamber, Fig. 2.

I have provided an automatic staker-device for holding the press in a stationary position while the same is in operation. This staker-device comprises a pair of downwardly-extending prongs or points 38; each prong being formed, preferably, of flat material and twisted intermediate its ends, as at 39, for forming a vertical portion 40. The vertical portions 40 are pivotally secured to the frame by any suitable fastening means. A reinforcing bar 41 is connected near its outer ends to the prongs near their lower ends; the bar 41 lying parallel with the lower portions of the prongs, which lower portions are formed at right-angles to the upper portions 40. A draft chain 42 is secured near its inner end to beam 27, and is, preferably, provided, near its outer end with a hook 43. When a draft animal is attached to the hook 43 and the chain 42 is raised, the staker-device will be lifted from engagement with the ground and the press will then be permitted to travel over the ground, but upon releasing the hook 43, the staker device will drop in engagement with the ground, and as soon as any strain is exerted upon the press which tends to draw it rearwardly, the sharpened or pointed ends of the points 38 will enter the ground and will hold the press in a stationary position.

It is to be understood that the greatest amount of power is obtained, by employing an eccentric sheave or wheel 14, at the desired time, and, furthermore, it will be obvious that the eccentric sheave or wheel causes an increase and decrease in power, as well as an increase and decrease in speed; hence the element necessary to compress a charge of hay, straw, or other material in the process of baling.

While I have described the flexible member 28 as a chain, it will be obvious that in the drawings I have illustrated the same as a cable chain, but any other chain may be employed without departing from the scope of the present invention.

What I claim is:

1. In a baling press, the combination with a framework, a movable plunger carried by said framework, a lever, means pivotally connecting said lever to said plunger, of an eccentric-sheave rotatably mounted upon said lever, a link carried by said framework and connected to said lever, a sheave wheel rotatably mounted upon said framework, and flexible means secured near one end to a portion of said framework and passed around a portion of said eccentric sheave and around a portion of the sheave secured to said framework.

2. In a baling press, the combination with a framework, a movable plunger carried by said framework, a lever pivotally connected near its lower end to said plunger, a link carried by said framework and pivotally connected to said lever of an eccentric sheave rotatably mounted between portions of said lever, a sheave or pulley carried by said framework, a chain secured near one end to said framework and extending between portions of said lever and passed around a portion of said eccentric sheave and under and around a portion of said sheave or pulley carried by the framework.

3. In a baling press, the combination with a framework and a plunger, a lever connected to said plunger, a link carried by said framework and pivotally connected to said lever of an eccentric sheave carried by said lever, a pulley carried by said framework, and flexible means connected to said framework and passed around said eccentric sheave and pulley, whereby when said flexible means is drawn outward at one of its ends, said lever and plunger will be actuated.

4. In a baling press, the combination with a frame work, a movable plunger carried by said framework, of a lever, means pivotally connecting said lever to said plunger, a fulcrum for said lever formed upon said framework, an eccentric sheave rotatably mounted upon said lever, and a flexible member secured to a portion of the press and passed around a portion of said eccentric sheave or wheel.

5. In a baling press, the combination with a framework a plunger movably mounted upon said framework, a lever pivotally connected to said plunger, of an eccentric sheave carried by said lever, a sheave or pulley carried by said framework, a chain fixedly secured near one end and passed around portions of said eccentric sheave and pulley, and means secured to said chain and normally engaging said pulley for normally holding the chain taut.

6. In a baling press, the combination with a framework, a plunger mounted in said framework, a lever pivotally connected to said plunger, of an eccentric sheave or wheel carried by said lever, a sheave-supporting frame carried by said framework, said sheave-supporting frame comprising an inner and an outer section, the outer section constituting a guide and a guard, a pulley or sheave carried by said sheave-supporting frame, and a chain secured near its inner end and passed around a portion of said eccentric sheave and around a portion of said pulley and positioned between portions of the guard section.

In testimony whereof I hereunto affix my signature in presence of two witnesses.

JOHN J. STOPPLE.

Witnesses:
E. H. NEWTON,
W. H. STOPPLE.